US012064853B2

(12) United States Patent
Kumagai et al.

(10) Patent No.: US 12,064,853 B2
(45) Date of Patent: Aug. 20, 2024

(54) IMPACT TOOL

(71) Applicant: MAKITA CORPORATION, Anjo (JP)

(72) Inventors: Ryunosuke Kumagai, Anjo (JP); Tokuo Hirabayashi, Anjo (JP); Tomoyuki Kondo, Anjo (JP)

(73) Assignee: MAKITA CORPORATION, Anjo (JP)

( * ) Notice: Subject to any disclaimer, the term of this patent is extended or adjusted under 35 U.S.C. 154(b) by 381 days.

(21) Appl. No.: 17/517,712

(22) Filed: Nov. 3, 2021

(65) Prior Publication Data

US 2022/0055191 A1 Feb. 24, 2022

Related U.S. Application Data

(62) Division of application No. 16/491,731, filed as application No. PCT/JP2017/045368 on Dec. 18, 2017, now Pat. No. 11,192,223.

(30) Foreign Application Priority Data

Mar. 7, 2017 (JP) ................................ 2017-043101

(51) Int. Cl.
*B25B 21/02* (2006.01)
*B25B 19/00* (2006.01)

(52) U.S. Cl.
CPC .............. *B25B 21/02* (2013.01); *B25B 19/00* (2013.01)

(58) Field of Classification Search
CPC ................................ B25B 21/02; B25B 19/00
See application file for complete search history.

(56) References Cited

U.S. PATENT DOCUMENTS

| | | | | |
|---|---|---|---|---|
| 3,208,569 A * | 9/1965 | Adee | B25B 21/026 173/93 |
| 3,606,931 A | 9/1971 | Karden | |
| 6,508,315 B1 | 1/2003 | Lindsay | |
| 7,784,561 B2 | 8/2010 | Lim | |
| 10,974,372 B2 * | 4/2021 | Tejima | B25B 19/00 |
| 11,192,223 B2 * | 12/2021 | Kumagai | B25B 19/00 |
| 2002/0094907 A1 * | 7/2002 | Elger | B25F 5/001 475/331 |

(Continued)

FOREIGN PATENT DOCUMENTS

| | | |
|---|---|---|
| CN | 101176989 A | 5/2008 |
| CN | 104044117 A | 9/2014 |

(Continued)

OTHER PUBLICATIONS

English translation of the International Search Report dated Sep. 13, 2018 for parent application No. PCT/JP2017/045368.

(Continued)

*Primary Examiner* — Praachi M Pathak
(74) *Attorney, Agent, or Firm* — J-TEK LAW PLLC; Jeffrey D. Tekanic; Scott T. Wakeman

(57) ABSTRACT

An impact tool (1; 1A) includes a spindle (12) rotated by a motor (10) and a hammer (70) rotated by the spindle. The hammer is designed to impact an anvil (14) in a rotational direction. A case (8) houses the hammer. A bearing (78A, 78B) is disposed between the hammer case and the anvil. An O-ring (84) is disposed between the anvil and the bearing.

26 Claims, 11 Drawing Sheets

(56) References Cited

U.S. PATENT DOCUMENTS

| | | | | |
|---|---|---|---|---|
| 2009/0223690 | A1 | 9/2009 | Sugimoto et al. | |
| 2009/0242222 | A1 | 10/2009 | Nagasaka et al. | |
| 2009/0309316 | A1 | 12/2009 | Hu | |
| 2012/0073845 | A1 * | 3/2012 | Nakamura | B25B 21/026 173/93.5 |
| 2012/0211249 | A1 * | 8/2012 | Seith | B25F 5/02 173/94 |
| 2012/0292065 | A1 * | 11/2012 | Hoshi | B25B 21/02 173/93 |
| 2014/0262396 | A1 | 9/2014 | McClung | |
| 2014/0274526 | A1 | 9/2014 | McClung | |
| 2014/0367132 | A1 * | 12/2014 | Tanaka | B25B 21/02 173/93 |
| 2015/0364972 | A1 | 12/2015 | Ito | |
| 2016/0375565 | A1 | 12/2016 | Koch | |
| 2017/0165817 | A1 * | 6/2017 | Vogt | B25B 21/02 |
| 2018/0222022 | A1 | 8/2018 | Kumagai et al. | |
| 2019/0262978 | A1 * | 8/2019 | Tejima | B25B 21/026 |
| 2020/0009709 | A1 * | 1/2020 | Kumagai | B25B 19/00 |
| 2023/0117577 | A1 * | 4/2023 | Nakashima | B25B 21/02 173/117 |
| 2023/0188020 | A1 * | 6/2023 | Zheng | H02K 9/06 310/50 |

FOREIGN PATENT DOCUMENTS

| | | | |
|---|---|---|---|
| CN | 104044118 | A | 9/2014 |
| CN | 205184693 | U | 4/2016 |
| JP | S56160769 | U | 11/1981 |
| JP | S58160774 | A | 9/1983 |
| JP | 2001054874 | A | 2/2001 |
| JP | 3146887 | U | 3/2001 |
| JP | 2010046787 | A | 3/2010 |
| JP | 2016107375 | A | 6/2016 |
| JP | 2016215373 | A | 12/2016 |
| TW | 200950938 | A | 12/2009 |

OTHER PUBLICATIONS

English translation of the Written Opinion of the International Searching Authority for parent application No. PCT/JP2017/045368.

Office Action and Search Report from the Chinese Patent Office dispatched Apr. 2, 2021 in related Chinese application No. CN 201780087815, and translation thereof.

Office Action and Search Report from the Chinese Patent Office dispatched Sep. 27, 2020 in related Chinese application No. CN 201780087815, and machine translation of the Office Action.

Office Action dated Sep. 15, 2020 from the United States Patent Office in related U.S. Appl. No. 16/251,425.

Office Action from the Japanese Patent Office dispatched Oct. 19, 2021 in related Japanese application No. 2019-504337, and machine translation thereof.

* cited by examiner

| APPARATUS VERIFIED | BEARING | DISPLACEMENT (mm) | | |
|---|---|---|---|---|
| | | LEFT | RIGHT | AVERAGE |
| EMBODIMENT OF FIG.10 | BALL BEARINGS | 0.02 | 0.02 | 0.02 |
| COMPANY A | NEEDLE BEARING | 0.04 | 0.06 | 0.05 |
| COMPANY B | NEEDLE BEARING | 0.07 | 0.06 | 0.065 |
| COMPANY C | SLEEVE | 0.1 | 0.07 | 0.085 |
| COMPANY D | NEEDLE BEARING | 0.04 | 0.05 | 0.045 |
| COMPANY E | SLEEVE | 0.15 | 0.2 | 0.175 |

IMPACT TOOL

The present application is a divisional of U.S. patent application Ser. No. 16/491,731 filed on Sep. 6, 2019, now U.S. Pat. No. 11,192,223, which is the US national stage of International application serial no. PCT/JP2017/045368 filed on Dec. 18, 2017, which claims priority to Japanese patent application serial number 2017-043101 filed on Mar. 7, 2017.

TECHNICAL FIELD

The present invention generally relates to a power tool such as an impact driver.

BACKGROUND ART

For example, in the impact driver shown in Japanese Laid open Patent Publication 2016-107375, a hammer is coupled, via balls, to a spindle, to which the rotation of a motor is transmitted. A rotational impact force (impact) is repetitively generated by a hammer striking an anvil, which constitutes an output shaft onto which a bit is mounted.

In such an impact driver, a tool holding apparatus on the output shaft includes: an insertion hole, into which the bit is inserted, which is provided in the axial center of the anvil; through holes, oriented in radial directions, that communicate with the insertion hole; and the balls disposed in those through holes that are caused to engage with the bit by being pressed by a manipulatable sleeve, which is mounted on the anvil in a forward and rearward movable manner. In this tool holding apparatus, the manipulatable sleeve is biased toward an engaging position (a retracted position) by a coil spring. Removal of the bit is performed by sliding the manipulatable sleeve against the bias of the coil spring to an advanced position at which the balls are not pressed.

SUMMARY OF THE INVENTION

However, in the above-described tool holding apparatus of JP 2016-107375, it is necessary to provide a fall out prevention part, which covers the balls, such that it extends from a rear end of the manipulatable sleeve so that the balls do not fall out when the manipulatable sleeve is slid to the advanced position. Consequently, the manipulatable sleeve is relatively long in the axial direction and the length by which the output shaft protrudes in order to ensure the stroke of the manipulatable sleeve cannot be shortened.

Moreover, there is another problem in that, although the anvil is axially supported in a case, such as a hammer case, by a bearing, such as a needle bearing, as disclosed in JP 2016-107375, because a clearance is created in the structure between the bearing and the anvil, the anvil rattles during rotation, thus causing the bit at the tip of the anvil to vibrate.

Accordingly, it is one non-limiting object of the present teachings to disclose: a tool holding apparatus, e.g., for a power tool, in which, even though a manipulatable sleeve is used, the length by which an output shaft protrudes can be shortened and the overall length of the tool holding apparatus can be made more compact.

In addition, another non-limiting object of the present teachings to disclose an impact tool in which rattling of an anvil can be reduced.

In one aspect of the present teachings, a tool holding apparatus optionally may comprise: an output shaft, to which power is transmitted; an insertion hole, which is formed in the output shaft at the axial center and faces toward a front end, and into which a bit is inserted; a through hole, which is formed in the output shaft such that it passes through in a radial direction, and which communicates with the insertion hole; a ball, which is disposed inside the through hole and is capable of protruding and retracting with respect to the insertion hole; and a manipulatable sleeve, which is externally mounted on (around) the output shaft such that it is slidable in an axial direction thereof. The manipulatable sleeve presses the ball at one position, which is either a forward or rearward position, to a protruding position inside the insertion hole, and releases the pressing of the ball at the other of the forward or rearward position. An elastic body biases the ball toward the protruding position and the manipulatable sleeve has a length such that at least a portion of the elastic body is exposed when the sleeve is moved to the other position.

The elastic body may be a flat spring that is externally mounted on (around) the output shaft on an outer (radially outer) side of the ball.

The flat spring may have a ring shape with a division portion (break) such that the flat spring has two ends (opposing ends) in the circumferential direction.

The division portion may be formed such that the break is tilted from the axial direction.

The flat spring may be externally mounted on (around) the outer side of the ball such that the flat spring covers only one-half of the ball, preferably either the front side or the rear side of the ball.

When the manipulatable sleeve is located at the one position, one longitudinal end of the sleeve optionally may be aligned or substantially (nearly) aligned, in the radial direction of the output shaft, with one lateral side edge of the ball.

A tapered portion, which expands as it goes toward the one longitudinal end of the sleeve, may be formed on an inner circumference thereof.

At the other position, the one longitudinal end of the manipulatable sleeve preferably does not overlap the ball in the radial direction of the output shaft.

In another aspect of the present teachings, a power tool may include an output shaft, to which power is transmitted by the drive of a motor, that protrudes from a housing, which houses the motor, wherein the tool holding apparatus according to any preceding aspect is provided on the output shaft.

In another aspect of the present teachings, an impact tool may comprise: a motor; a spindle, which is rotated by the motor; a hammer held by the spindle; an anvil, which is impacted (struck) by the hammer in a rotational direction; a case, which houses the hammer; and a front side first bearing and a rear side second bearing, which are held in the case. The first bearing and the second bearing directly hold the anvil to support rotational movement of the anvil.

The first bearing and the second bearing may be both ball bearings.

A bearing retaining part, which retains the first bearing and the second bearing, may be formed in the case. In this aspect, an inner diameter of the bearing retaining part is constant in an axial direction of the anvil; furthermore, an outer diameter of the first bearing and an outer diameter of the second bearing are identical.

A first ring-shaped member may be disposed on a radially inner side of the first bearing and a second ring-shaped member may be disposed on a radially inner side of the second bearing.

The hammer may be disposed rearward of the anvil and the first bearing and the second bearing may be inserted into the case from the rear and held thereby.

The first bearing may comprise a first inner ring, a first outer ring, and first balls between the inner ring and the outer ring; the second bearing may comprise a second inner ring, a second outer ring, and second balls between the inner ring and the outer ring. A spacer member, which makes contact with the first outer ring and the second outer ring, may be disposed between the first bearing and the second bearing.

A retaining ring, which makes contact with a rear surface of the second bearing, may be provided in the case.

In another aspect of the present teachings, an impact tool may comprise: a motor; a spindle, which is rotated by the motor; a hammer held by the spindle; an anvil, which is impacted (struck) by the hammer in a rotational direction; and a case, which houses the hammer and from which the anvil protrudes. At the position at which the amount of protrusion of the anvil from the case is 10 mm, the amount of lateral displacement of the anvil when a lateral load of 9.8 N is applied is 0.04 mm or less.

According to one aspect of the present teachings, because the elastic body, which biases the ball toward the protruding position, is provided and the manipulatable sleeve has a length such that at least a portion of the elastic body is exposed at the other position at which the pressing of the ball is released, even if the manipulatable sleeve is slid to the other position, the ball is prevented by the elastic body from falling out, and the length by which the manipulatable sleeve extends forward-rearward can thereby be shortened. As a result, it becomes possible to dispose the ball more on the rear side or the front side than in the past, such that the length that the output shaft protrudes can be shortened even though the manipulatable sleeve is used, and, in turn, the overall length of the tool holding apparatus can be made more compact.

According to another aspect of the present teachings, the anvil is directly held in a rotatable manner by the two (i.e. front and rear) bearings, and therefore rattling of the anvil can be effectively reduced, and vibration of the tip bit can be inhibited.

DETAILED DESCRIPTION OF THE EMBODIMENTS

Embodiments of the present invention are explained below, based on the drawings.

Explanation of a Representative Impact Driver

Figure 1:
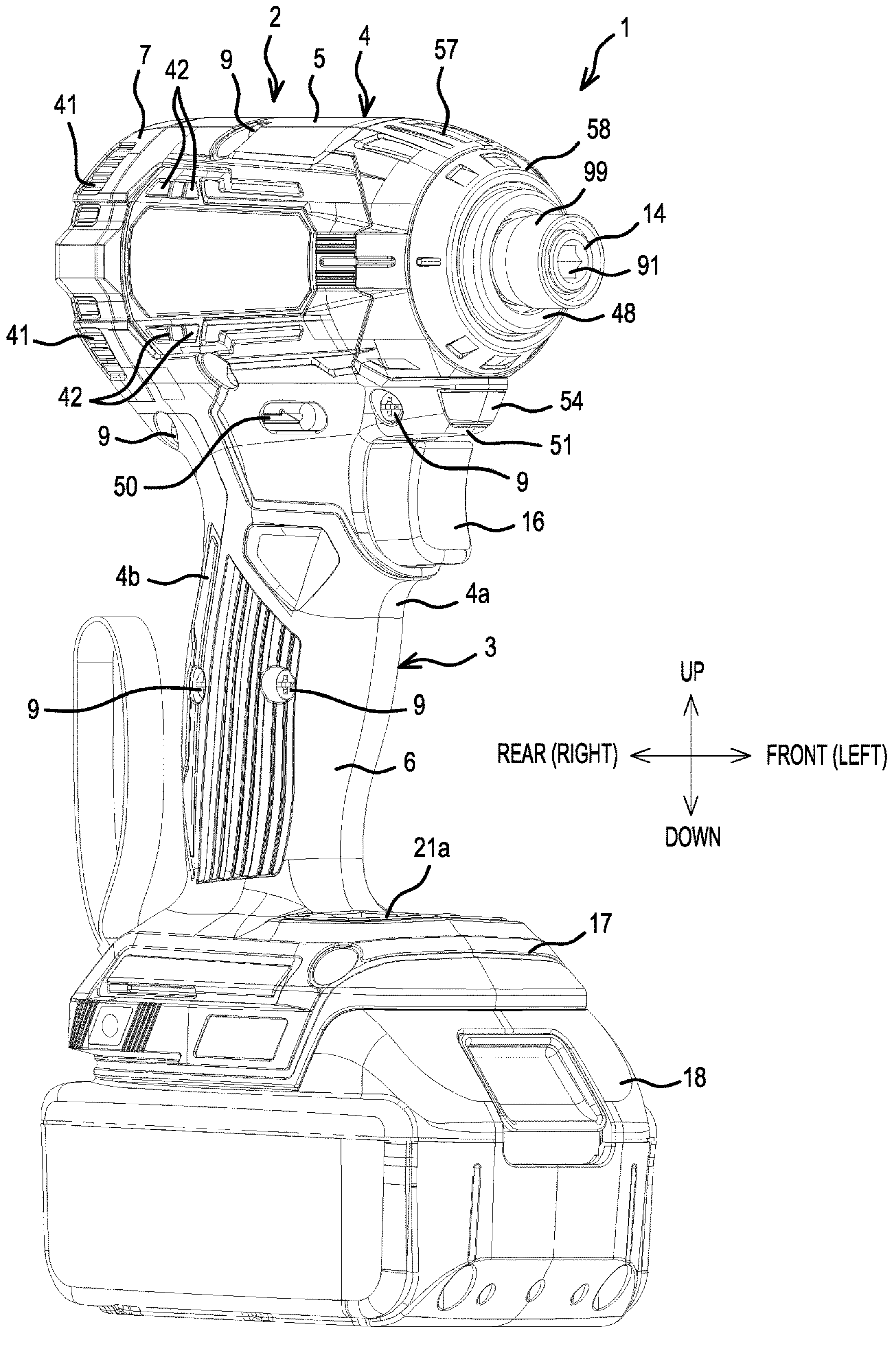
FIG. 1 is an oblique view of an impact driver according to the present teachings.
Figure 2:
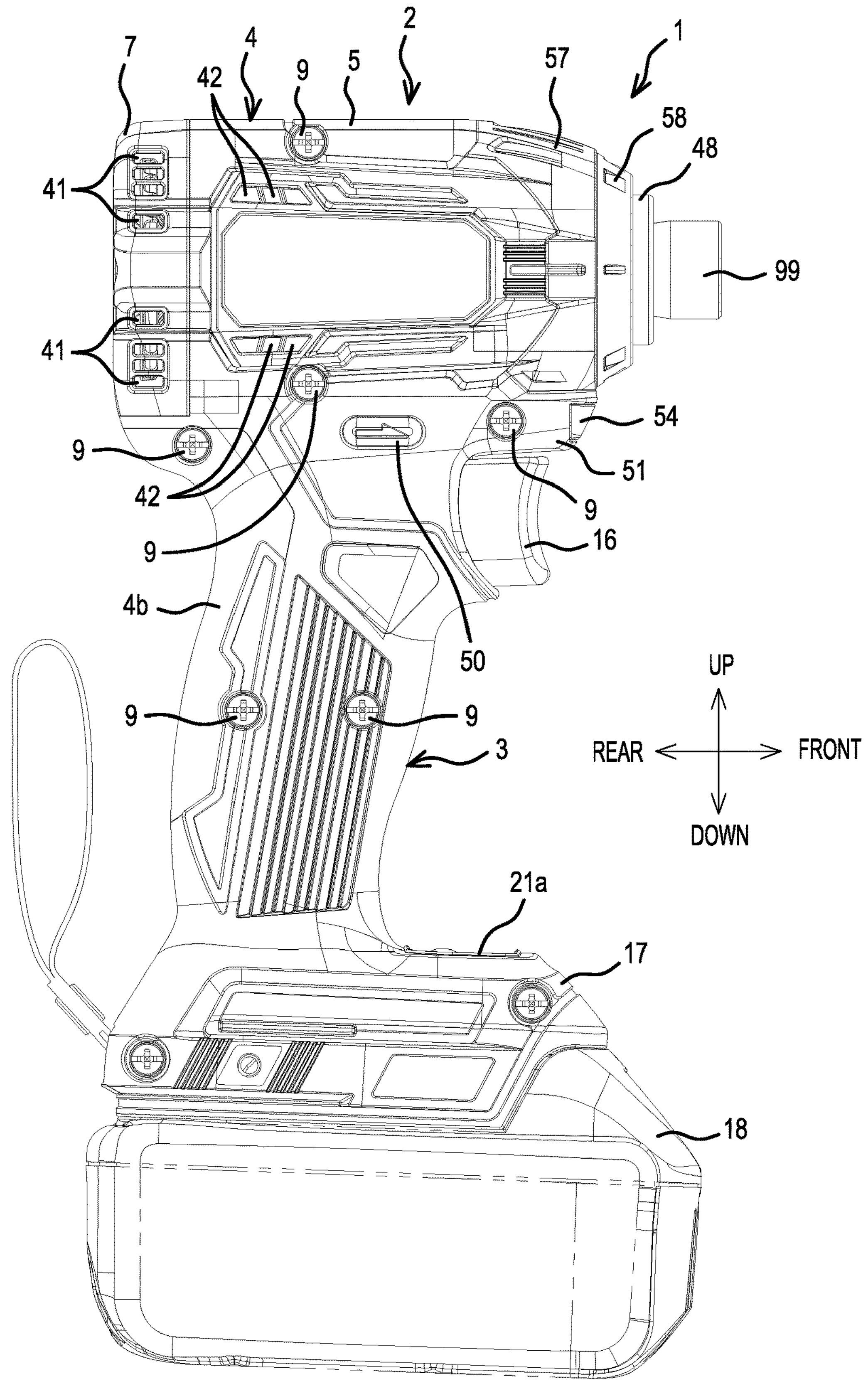
FIG. 2 is a side view of the impact driver.
Figure 3:
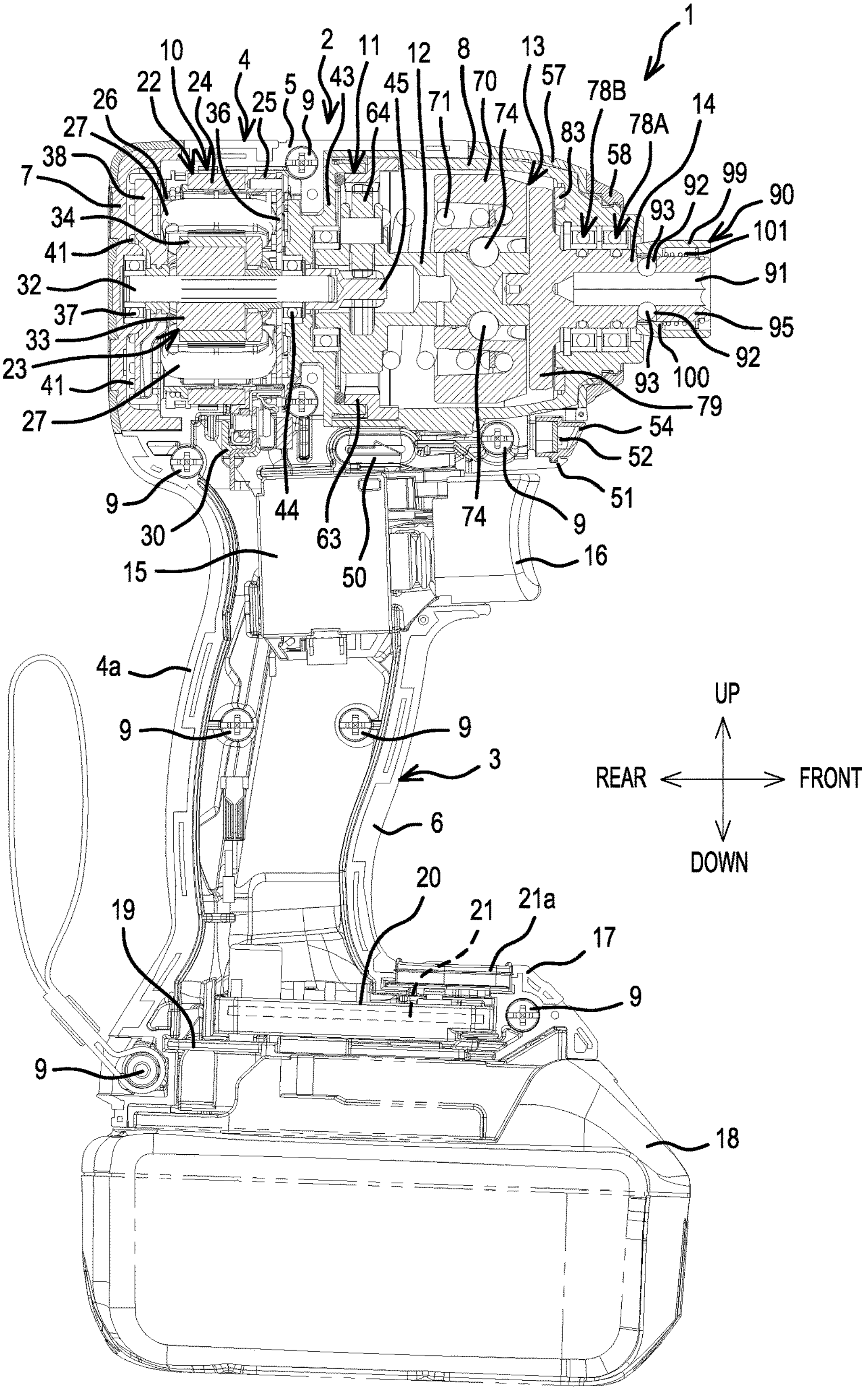
FIG. 3 is a center longitudinal cross sectional view of the impact driver.
Figure 4:
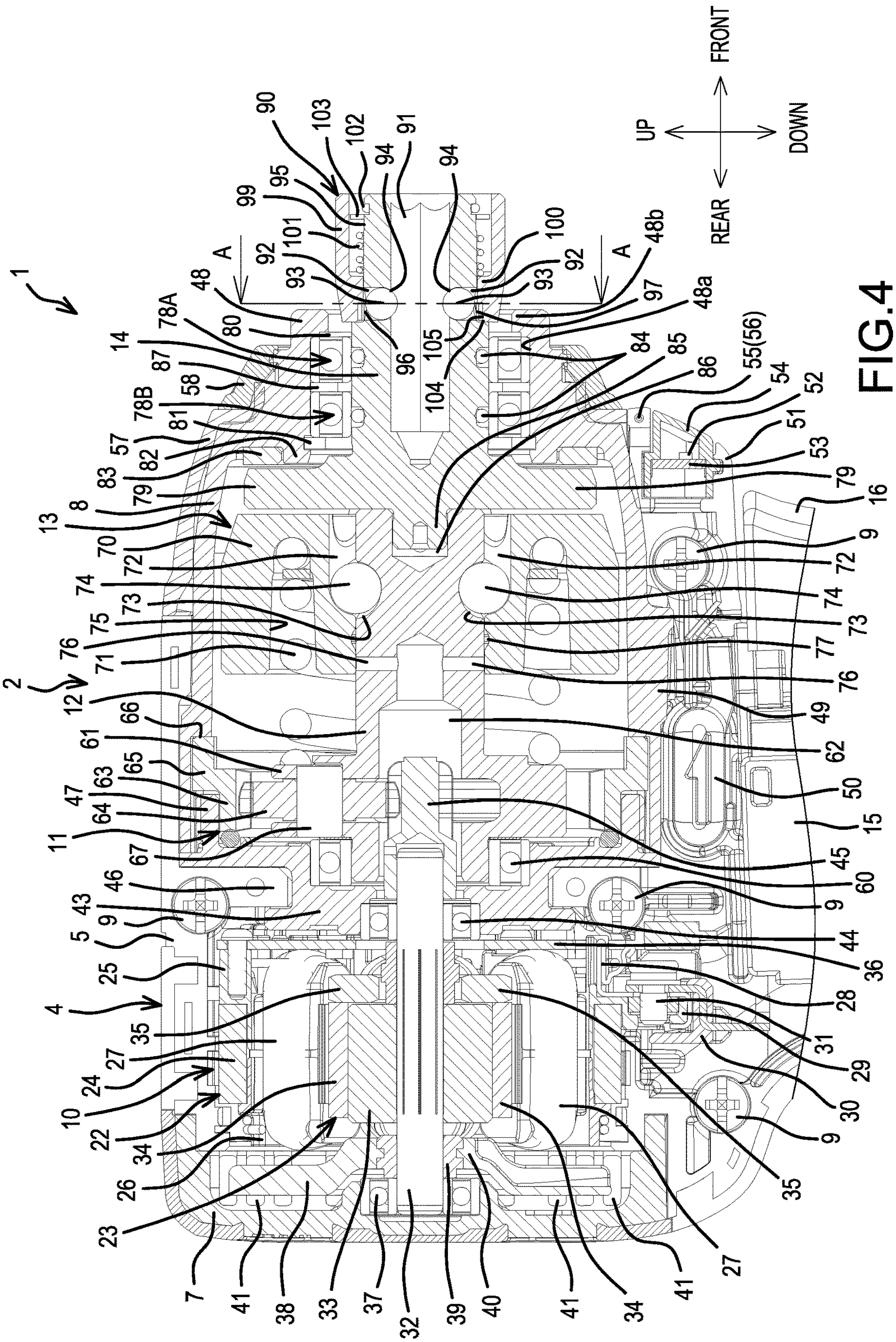
FIG. 4 is an enlarged cross sectional view of a main body part.

FIG. 1 is an oblique view of an impact driver 1, which is one example of a power tool according to the present teachings; FIG. 2 is a side view thereof; FIG. 3 is a center longitudinal cross sectional view thereof; and FIG. 4 is an enlarged cross sectional view of a main body part.

The impact driver 1 comprises: a main body part 2, whose central axis extends in a front-rear direction; and a grip part 3, which protrudes downward from the main body part 2. A housing of the impact driver 1 comprises: a main body housing 4, in which a tube shaped motor housing 5 that constitutes the main body part 2 and a grip housing 6 that constitutes the grip part 3 are coupled; a rear cover 7, which is mounted, by screw fastening, on a rear end of the motor housing 5; and a hammer case 8, which serves as a case and is joined to a front part of the motor housing 5. The main body housing 4 is divided into left and right half housings 4*a*, 4*b*, which are joined together by screws 9 in the left right direction.

In order from the rear, a motor 10, a planetary gear, speed-reducing mechanism 11, a spindle 12, and an impact mechanism 13 are provided in the main body part 2. In the motor housing 5 of the motor 10, the planetary gear, speed-reducing mechanism 11, the spindle 12, and the impact mechanism 13 are each housed in the hammer case 8; and an anvil 14, which is provided on the impact mechanism 13 and constitutes an output shaft, protrudes forward from a front end of the hammer case 8.

A switch 15, from which a trigger 16 protrudes forward, is housed in an upper part of the grip part 3. A battery mount part 17, on which a battery pack 18 that constitutes a power supply is mounted, is formed on a lower end of the grip part 3. A terminal block 19, which is electrically connected to the battery pack 18, and a controller 20, which is located thereabove, are housed inside the battery mount part 17. A control circuit board 21, on which a microcontroller, a switching terminal, etc. are installed, is provided on the controller 20. An operation panel 21*a* is electrically connected to the control circuit board 21 and enables manual selection of the operation mode, displays the remaining charge of the battery pack 18, and the like. The operation panel 21*a* is provided on an upper surface of the battery mount part 17.

The motor 10 is an inner-rotor-type brushless motor that comprises a stator 22 and a rotor 23. The stator 22 comprises: a stator core 24; a front insulating member 25 and a rear insulating member 26, which are respectively provided forward and rearward of the stator core 24; and a plurality of coils 27, which are wound around the stator core 24 through the front insulating member 25 and the rear insulating member 26 and are held inside the motor housing 5. Three fusing terminals 28, are provided on the front insulating member 25; one end of each fusing terminal 28 sandwiches and fuses a wire of the coils 27, and the other end of each fusing terminal 28 is guided around a coupling piece 29, which is provided such that it protrudes downward from a lower end of the front insulating member 25. A terminal unit 30 (which is U-shaped in side view) is wired from the controller 20, and to which lead wires corresponding to the fusing terminals 28 are soldered. The terminal unit 30 is joined to the coupling piece 29 from below by a screw 31 such that the terminal unit 30 is pinched by the coupling piece 29 and thereby electrically connected thereto. A three-phase power supply line, which is routed from the terminal unit 30, passes rearward of the switch 15 through the interior of the grip part 3 and is connected to the control circuit board 21 inside the controller 20.

The rotor 23 comprises: a rotary shaft 32, which is located at the axial center; a tube shaped rotor core 33, which is disposed around the rotary shaft 32; permanent magnets 34, which are disposed on an outer side of the rotor core 33, which are tube shaped, and whose polarities alternate in the circumferential direction; and a plurality of sensor permanent magnets 35, which are disposed radially on front sides of the permanent magnets 34. A sensor circuit board 36, which detects the positions of the sensor permanent magnets 35 of the rotor 23 and on which three rotation detection devices that output rotation detection signals are mounted, is fixed by a screw to a front end of the front insulating member 25. Signal lines, which are for outputting the rotation detection signals, are connected to a lower end of the sensor circuit board 36, and these signal lines also pass rearward of the switch 15 through the interior of the grip part 3 and are connected to the control circuit board 21 inside the controller 20, the same as the power supply lines.

The rear cover 7 is attached on the rear side of the motor housing 5 by screws (not shown) and has a cap shape. A bearing 37 is held by the rear cover 7, and axially supports a rear end of the rotary shaft 32. A centrifugal fan 38 for cooling the motor is mounted on the rotary shaft 32 via an insert bushing 39, which is made of metal, forward of the bearing 37. A center part of the fan 38 is a flared part 40 that flares forward in a bowl shape, and the bearing 37 is disposed such that it overlaps, in a radial direction, the centrifugal fan 38 immediately on a rear side of the flared part 40. Air exhaust ports 41, which are located on the outer side in the radial direction of the centrifugal fan 38, are formed in side surfaces of the rear cover 7, and air suction ports 42, are formed in side surfaces of the motor housing 5.

On the other side of the motor 10, a front end of the rotary shaft 32 is inserted through a bearing retainer 43, which is forward of the motor 10 and held by the motor housing 5. The front end of the rotary shaft 32 protrudes forward, and is axially supported by a bearing 44, which is held by a rear part of the bearing retainer 43. A pinion 45 is mounted on the front end of the rotary shaft 32.

The bearing retainer 43 is made of metal and has a disk shape, the center of which is formed into a neck part. By mating a rib 46, which is provided on an inner surface of the motor housing 5, in the neck part, the bearing retainer 43 is held by the motor housing 5 such that movement of the bearing retainer 43 is restricted in the front-rear direction.

In addition, a ring wall 47, on which a male thread part is formed on the outer circumference, is provided on a peripheral edge of the front surface of the bearing retainer 43 such that it projects forward. A female thread part, which is provided on a rear end inner circumference of the hammer case 8, is coupled to the ring wall 47.

The hammer case 8 is a tubular body which is made of metal, and in which a front half part is tapered to form a front tube part 48 and a rear part of the hammer case 8 is closed up by the bearing retainer 43, which constitutes a cover. A projection 49 is formed on a lower surface of the hammer case 8, and, in the assembled state, presser ribs (not shown), which project from the inner surfaces of the left and right half housings 4*a*, 4*b*, make contact with side surfaces of the projection 49.

In addition, projections (not shown) are formed on the left- and right-side surfaces of the hammer case 8, and these projections are configured such that they mate with recessed grooves (not shown) formed in the inner surfaces of the half housings 4*a*, 4*b*. Owing to the engagement of the projection 49 and the presser ribs as well as the engagement of the projections and the recessed grooves, rotation of the hammer case 8 is restricted.

A forward/reverse switching lever 50 of the motor 10 is provided, such that it is capable of sliding to the left and right, between the hammer case 8 and the switch 15. Forward thereof, a radiating part 51 is provided on the main body housing 4 along the lower surface of the hammer case 8. An LED board 53, which comprises an LED 52 that irradiates forward of the anvil 14, is housed inside the radiating part 51; and a lens 54, which covers the LED board 53 from the front, is attached. At a front end upper part of the radiating part 51, a recessed part 55 is provided on one of the left and right half housings 4*a*, 4*b*, and a protruding part 56 is provided on the other. By mating the recessed part 55 and the protruding part 56 in the assembled state, the lens 54 is positioned inside the radiating part 51. In addition, a cover 57, which covers the front tube part 48 of the hammer case 8 on the front side of the hammer case 8, is provided forward of the motor housing 5. A bumper 58, which is made of rubber, is mounted on a front end, outer circumference part of the cover 57.

Furthermore, a bearing 60 is held by the front part of the bearing retainer 43, and a rear end of the spindle 12 is axially supported by the bearing 60. The spindle 12 comprises a disk-shaped carrier part 61, the rear part of which is hollow. The front end of the rotary shaft 32 and the pinion 45 protrude into the interior of a bottomed hole 62, which extends from a rear surface frontward along the axial center.

The planetary gear, speed-reducing mechanism 11 comprises an internal gear 63, which has internal teeth, and three planetary gears 64, which have external teeth that mesh with the internal gear 63. The internal gear 63 is coaxially housed on the inner side of the ring wall 47 of the bearing retainer 43. A rotation stop part 65, which engages with a recessed part (not shown) formed forward of the female thread part on an inner circumferential surface of the hammer case 8, is provided on the forward, outer circumferential side of the ring wall 47. Because the rotation stop part 65 is pinched between the ring wall 47 and a step part 66, which is provided on the inner circumferential surface of the hammer case 8, movement is also restricted in the axial direction. The planetary gears 64 are rotatably supported inside the carrier part 61 of the spindle 12 by pins 67 and mesh with the pinion 45 of the rotary shaft 32.

The impact mechanism 13 comprises a hammer 70, which is externally mounted on (around) the spindle 12, and a coil spring 71, which biases the hammer 70 forward. The hammer 70 comprises a pair of tabs (not shown) on its front surface and couples with the spindle 12 via balls 74, 74, which extend over and mate with outer side cam grooves 72 formed on an inner surface, and inner side cam grooves 73 formed on a surface of the spindle 12. In addition, a ring-shaped groove 75 is formed on a rear surface of the hammer 70, and a front end of the coil spring 71 is inserted therein. A rear end of the coil spring 71 makes contact with a front surface of the carrier part 61. A ring-shaped recessed groove 77, which communicates with communication holes 76 (which are formed such that they pass through in radial directions from the bottomed hole 62 of the spindle 12) at a retracted position during an impact operation, is formed on an inner circumference of the hammer 70. Lubrication between the hammer 70 and the spindle 12 is achieved by the supply of grease inside the bottomed hole 62 to the recessed groove 77 via the communication holes 76.

Explanation of Axial Support Structure of Anvil

The anvil 14 is axially supported by ball bearings 78A, 78B, which serve as two (forward and rearward or first and second) bearings, that are held inside the front tube part 48, which serves as a bearing retaining part of the hammer case 8. A pair of arms 79, 79, which respectively engage with the pair of tabs of the hammer 70 in the rotational direction, is formed on a rear end of the anvil 14.

Figure 7B:
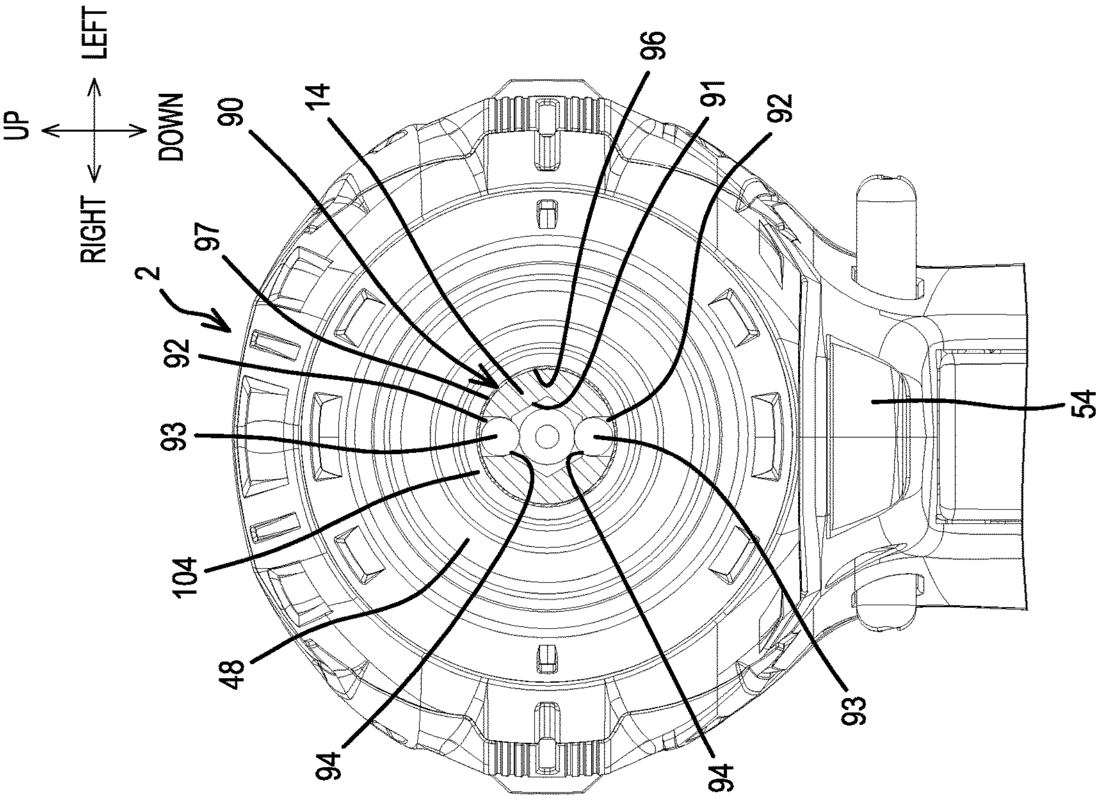
FIG. 7B is a cross sectional view taken along line B-B.
Figure 7A:
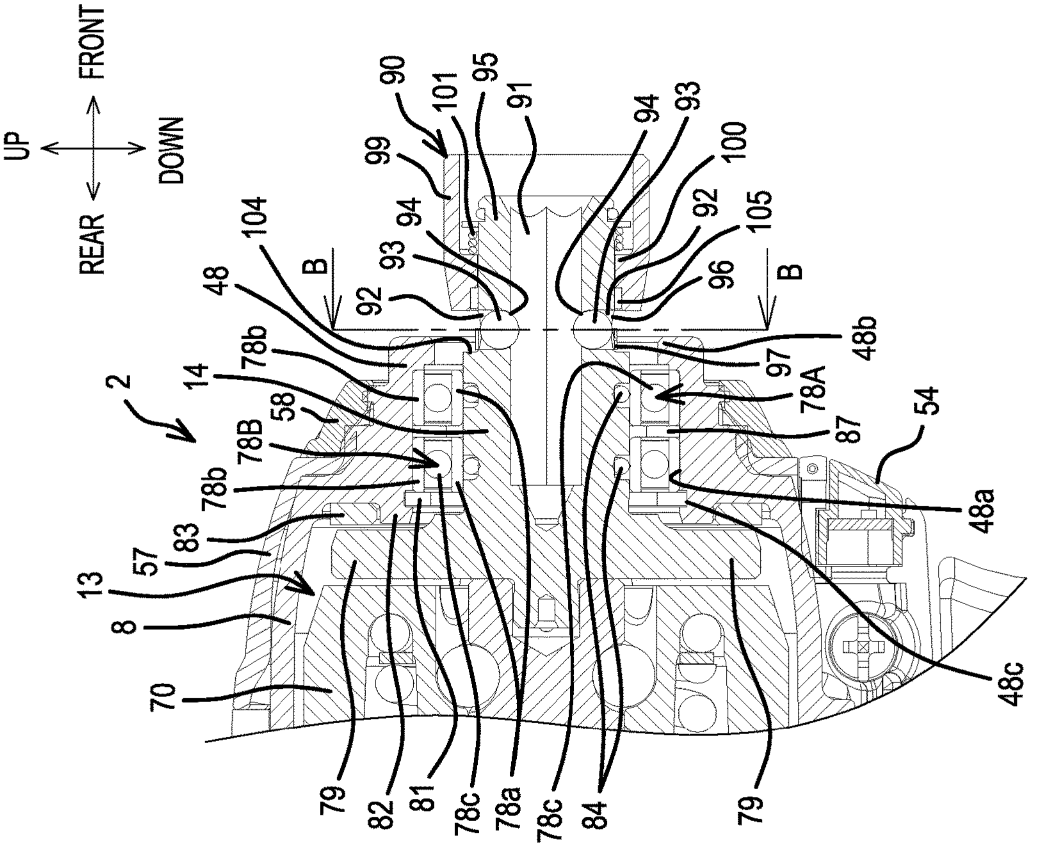
FIG. 7A is an enlarged view of a tool holding apparatus (in which a manipulatable sleeve is located at an advanced position)
Figure 9:
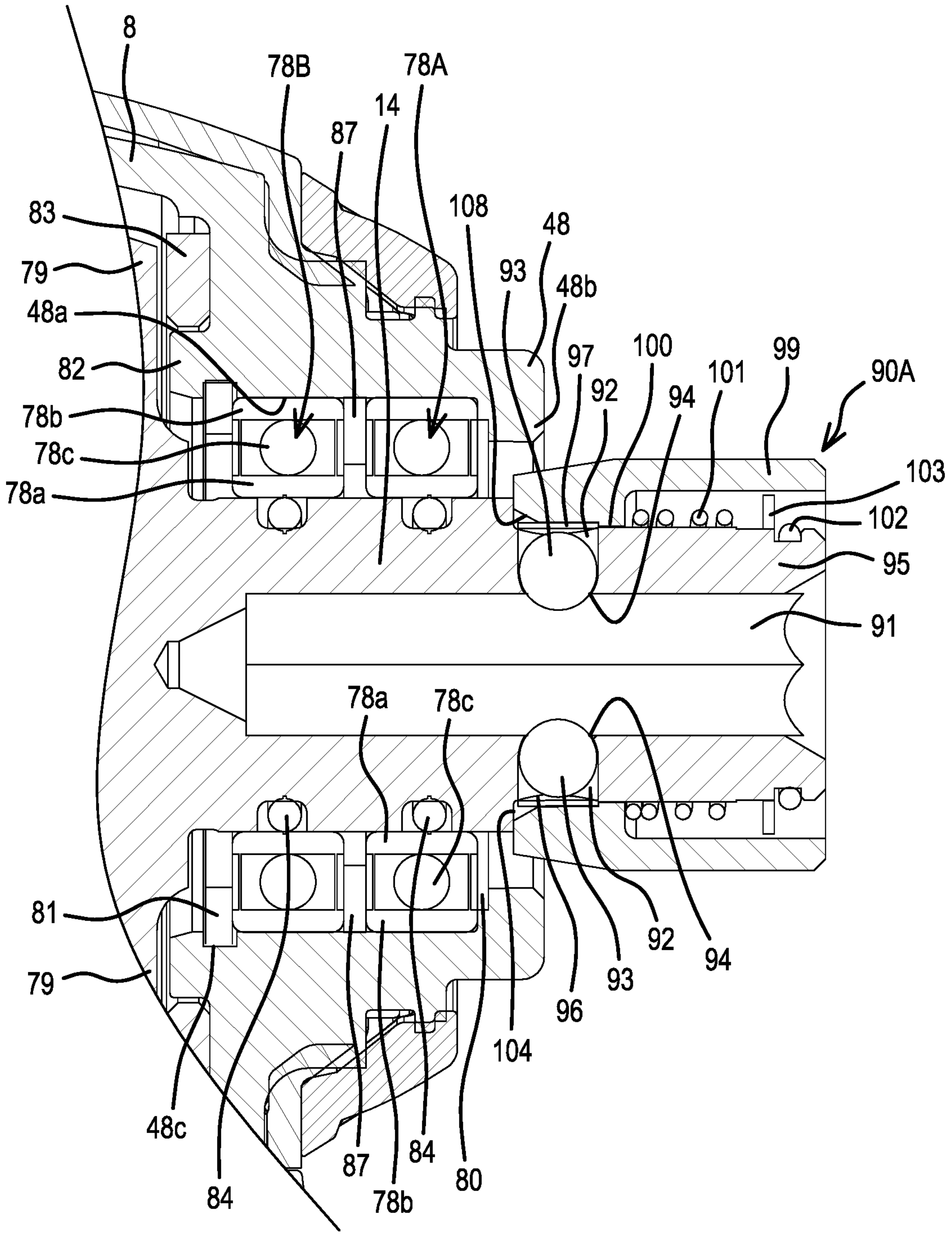
FIG. 9 is an explanatory diagram that shows a modified example of the tool holding apparatus according to the present teachings.

As shown in FIGS. 7A, 7B and 9, the ball bearings 78A, 78B comprise: inner rings 78*a*, which serve as first and second inner rings; outer rings 78*b*, which serve as first and second outer rings; and a plurality of balls 78*c* disposed between each of the sets of inner and outer rings in one row in the circumferential direction and serving as first and second balls. An intermediate washer 87, which serves as a spacer member, is interposed between the two ball bearings 78A, 78B. By virtue of the intermediate washer 87 making contact with the outer rings 78*b*, 78*b* of the first and second ball bearings 78A, 78B, a prescribed spacing is maintained between the first and second ball bearings 78A, 78B.

Here, the first and second ball bearings 78A, 78B and the intermediate washer 87 have the same outer diameter and are inserted, from the rear, into an inner diameter part 48*a* of the front tube part 48, the diameter of which is constant from front to rear. A ring-shaped positioning part 48*b*, the diameter of which is smaller than that of the inner diameter part 48*a*, is provided around a front end of the front tube part 48 and is positioned forward of the outer ring 78*b* by virtue of the outer ring 78*b* of the front side ball bearing 78A making contact with the positioning part 48*b*. A front washer 80, which closes up the space between the anvil 14 and the positioning part 48*b* and is designed to protect the ball bearings 78A, 78B from dust, is provided between the front-side ball bearing 78A and the positioning part 48*b* inside the front tube part 48. A rear washer 81, which serves as a retaining ring for positioning of the ball bearing 78B on the rearward side, is provided rearward of the rear-side (second) ball bearing 78B. The rear washer 81 has an outer diameter that is larger than that of the second ball bearing 78B and of the inner diameter part 48*a*, mates with a groove 48*c*, which is provided on an inner circumferential surface of the front tube part 48 and extends in the circumferential direction, and makes contact with the outer ring 78*b* of the second ball bearing 78B.

In addition, a ring-shaped retaining part 82, whose inner diameter is smaller than the outer diameter of the rear washer 81 and whose outer diameter is larger than the outer diameter of the rear washer 81, is coaxially provided forward of the arms 79, 79 such that it protrudes from a rear-surface, inner circumference side of the front tube part 48. An outer washer 83, which is made of resin and is thick, and whose rear surface is located rearward of the retaining part 82, mates with an outer side of the retaining part 82. The outer washer 83 receives the arms 79, 79.

Furthermore, two O-rings 84, 84, which serve as first and second ring-shaped members, are provided forward and rearward on the inner sides of the ball bearings 78A, 78B in the anvil 14 and contact the inner rings 78*a*, 78*a* of the ball bearings 78A, 78B, respectively, on a radially outward side of the O-rings 84, 84 and contact a shaft portion of the anvil 14 on a radially inward side of the O-rings 84, 84. As shown in FIG. 9, the O-rings 84, 84 may be respectively disposed in two circumferentially-extending grooves defined in the shaft portion of the anvil 14. A mating projection 85, which mates with a mating recessed part 86 provided on a front end of the spindle 12 at the axial center, is formed on a rear surface of the anvil 14 at the axial center.

Explanation of Tool Holding Apparatus

In addition, a tool holding apparatus 90, which is for holding a bit, is provided on the anvil 14. The tool holding apparatus 90 will be discussed in detail below.

Figure 5:
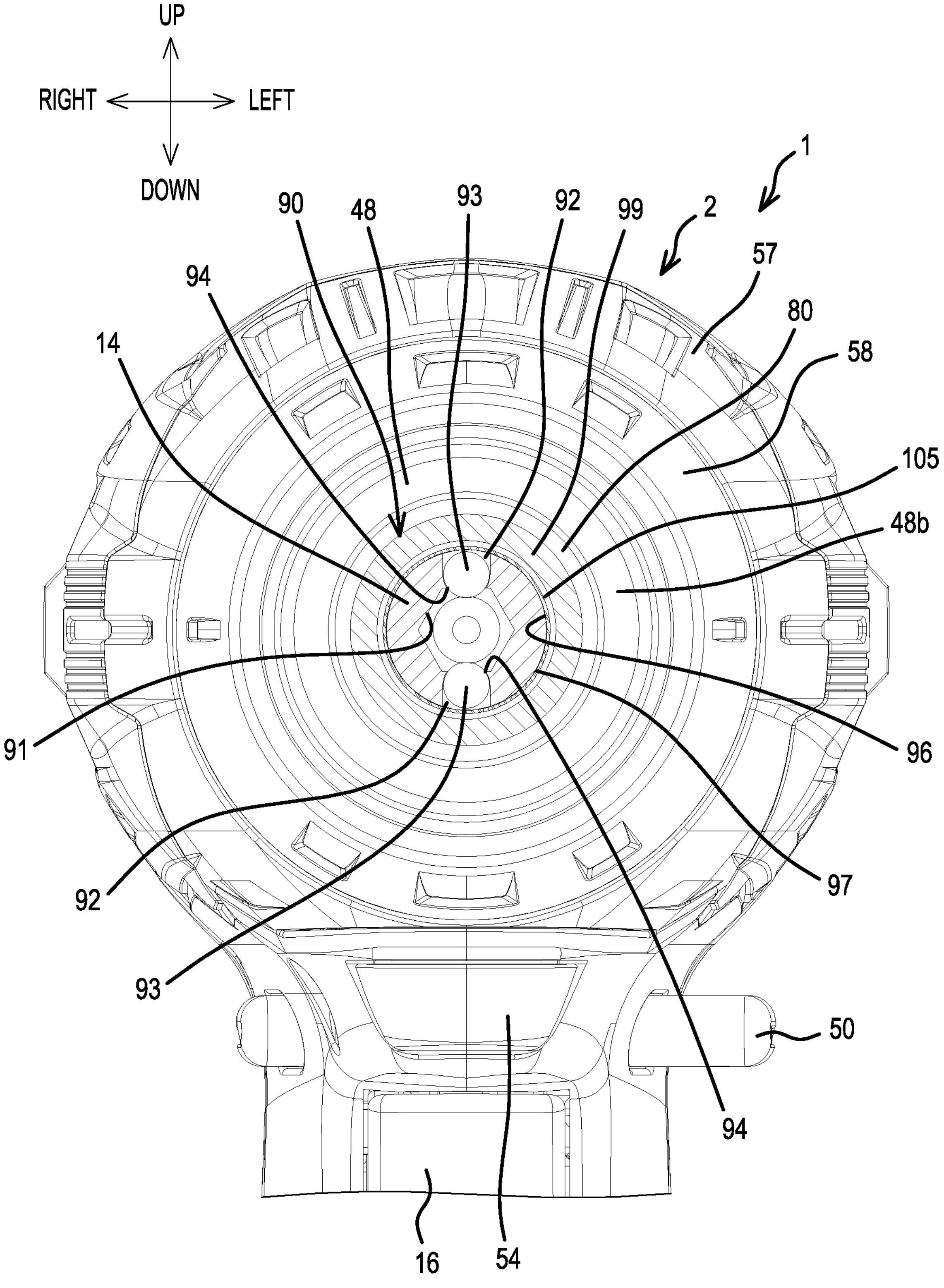
FIG. 5 is a cross sectional view taken along line A-A in FIG. 4.

An insertion hole 91, which has a hexagonal shape in transverse section and into which the bit is insertable from the front, is formed in the anvil 14 from the front end at the axial center. As shown in FIG. 5, a pair of radially-extending through holes 92 is formed inside the anvil 14 at point symmetric positions centered on the insertion hole 91 such that the two through holes 92 communicate with the insertion hole 91. A ball 93 is housed in each of the two through holes 92. Openings 94 of the through holes 92 on the side that communicates with the insertion hole 91 are formed smaller than the diameter of the balls 93 so that the balls 93 do not drop (fall) completely into the insertion hole 91.

The through holes 92 and the balls 93 are disposed rearward as far as the position at which the front end of the outwardly-disposed front tube part 48 overlaps with the anvil 14 in the radial direction.

Figure 6:
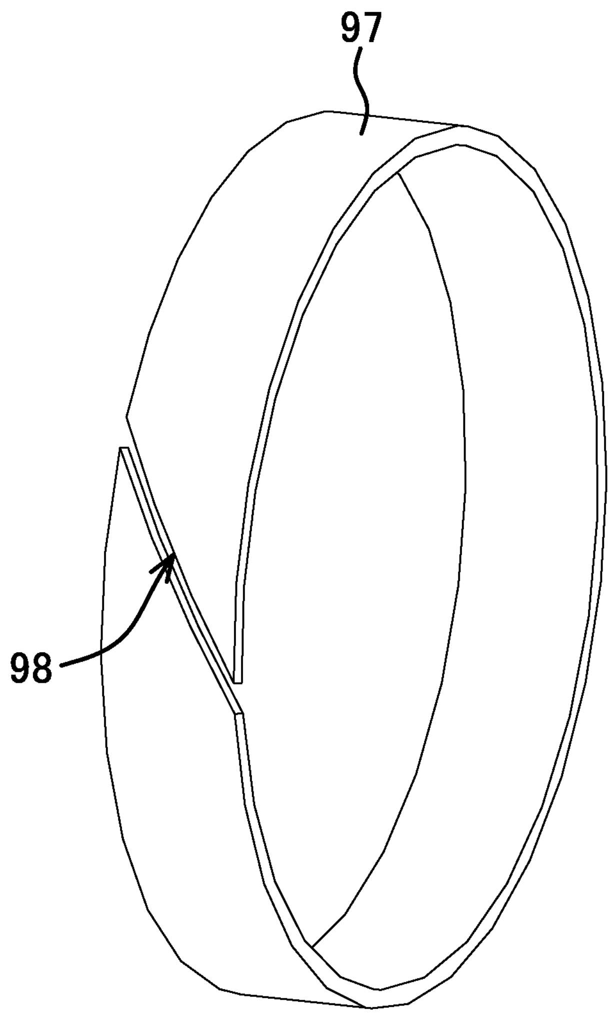
FIG. 6 is an oblique view of a flat spring.

In addition, a front half portion of the anvil 14, which includes the through holes 92, 92 around the outer circumference, constitutes a small diameter part 95 and has a diameter smaller than that of a rear half side of the anvil 14. A retaining groove 96 is formed, around the entire circumference including the through holes 92, 92, in a base of the small diameter part 95. A flat spring (circular spring clamp) 97, which serves as an elastic body, is externally mounted in the retaining groove 96. The flat spring 97 has a front-rear width that is approximately half the diameter of each ball 93. As shown in FIG. 6, the flat spring 97 has a ring (annular) shape that is divided (broken, discontinuous) at one location such that a division portion (break) 98 has a diagonal slit shape that is tilted from the axial direction. The flat spring 97 encircles the retaining groove 96, such that the flat spring 97 is somewhat elastically expanded, and makes contact with a rear half side of each of the balls 93. Even though the flat spring 97 is thus expanded from its resting state, contact with the balls 93 can be maintained around the entire circumference because the division portion 98 is cut diagonally. Thereby, in the normal state, the compression-biased flat spring 97 biases (urges) the balls 93 toward a protruding position at which the balls 93 partially protrude from (through) the openings 94 of the through holes 92 into the insertion hole 91.

Furthermore, a manipulatable (manually-operable) sleeve 99 is externally mounted on (around) the small diameter part 95 of the anvil 14. The manipulatable sleeve 99 is a tubular body that has a ridge 100, which is adjacent to the outer circumference of the small diameter part 95, on its rear end inner side and whose inner circumference on the front side has a diameter larger than that of the inner diameter of the ridge 100. A coil spring 101, which is externally mounted on the small diameter part 95, is interposed between the ridge 100 and a locking washer 103, which is positioned by a retaining ring 102 at a front end, outer circumference of the small diameter part 95. Thereby, the manipulatable sleeve 99 is normally biased toward a retracted (rearward-most) position at which the rear end of the manipulatable sleeve 99 makes contact with a ring-shaped stopper surface 104 formed on a base outer circumference of the small diameter part 95.

At this retracted position, the ridge 100 is proximate to the front half side of the balls 93, which are pressed to the protruding position by the flat spring 97, and restricts (blocks) movement of the balls 93 toward the outer side. The front end of the flat spring 97 makes contact with the rear surface of the ridge 100. At a rear side of the ridge 100, the inner circumference of the manipulatable sleeve 99 constitutes a circumvent (wider diameter) part 105, because it has a diameter larger than that of the flat spring 97.

It is noted that, because the rear washer 81, the ball bearings 78A, 78B, and the intermediate washer 87 are disposed on the radially outer side of the insertion hole 91, the length of the anvil 14 in the front-rear direction can be made shorter than an embodiment in which the rear washer 81, the ball bearings 78A, 78B, and the intermediate washer 87 are disposed rearward of (the bottom or base of) the insertion hole 91. In this embodiment, the retaining part 82 is also disposed on the radially outer side of the rear end of the insertion hole 91.

In the impact driver 1 configured as described above, when the bit is to be mounted on the anvil 14 of the tool holding apparatus 90, the manipulatable sleeve 99, which is at the retracted position (first or rearward position), is slid against the biasing of the coil spring 101 as far as an advanced position (second or forward position) at which the rear end (edge) of the sleeve 99 becomes a radially outward extension of the front end of the retaining groove 96, as shown in FIG. 7A. Thereby, the ridge 100 separates forward from the outer side of the balls 93, and the restriction on the movement of the balls 93 toward the outer side (i.e. radially outward) is released. However, owing to the compression bias of the flat spring 97, the balls 93 continue to protrude from (through) the openings 94 without falling out from (through) the through holes 92 into the insertion hole 91. At this advanced (second or forward) position, the rear end (edge) of the manipulatable sleeve 99 is substantially aligned with the front end (edge) of the balls 93, thereby exposing the balls 93 and the flat spring 97.

Figure 8A:
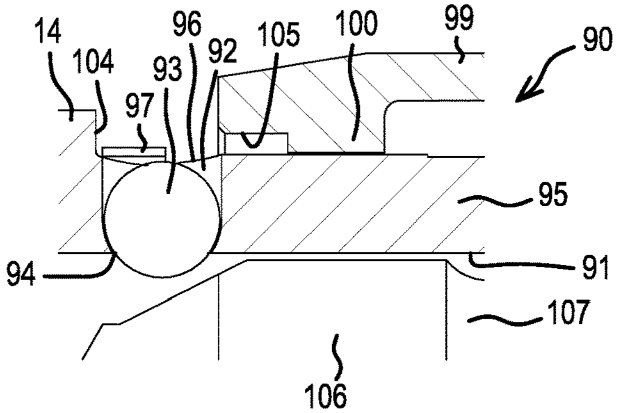
FIGS. 8A-D are explanatory diagrams that show a bit mounting procedure.
Figure 8B:
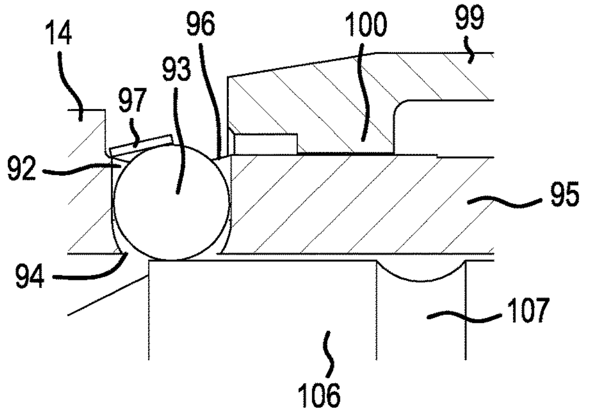

At this time, as shown in FIG. 8A, a rear end of a bit 106 is inserted into the insertion hole 91 while the manipulatable sleeve 99 being maintained (held) at the advanced position. During the insertion of the bit 106, as shown in FIG. 8B, the balls 93 make contact with the rear end of the bit 106 and are pushed radially outward against the compression bias of the flat spring 97, and are thereby moved to a retracted position at which they are retracted into the through holes 92. Thereby, the bit 106 can be fully inserted into the insertion hole 91.

Figure 8C:
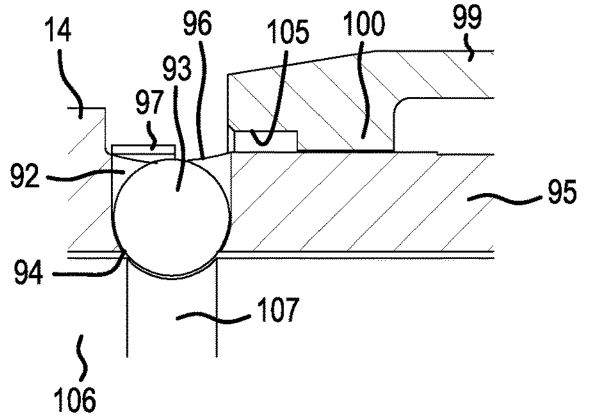

When the bit 106 is fully inserted into the insertion hole 91, as shown in FIG. 8C, an engaging groove 107, which is provided on an intermediate portion of the bit 106, is located on the inner side of the balls 93, which permits the balls 93 to return once again to their protruding position, owing to the compression bias of the flat spring 97. As a result, the balls 93 engage with (in) the engaging groove 107.

Figure 8D:
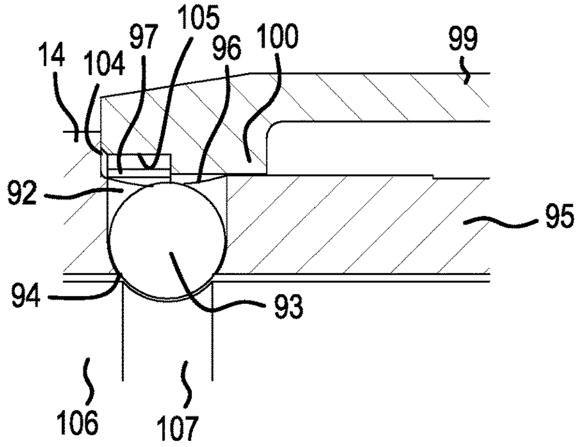

Thereafter, as shown in FIG. 8D, the manipulatable sleeve 99 is slid to its retracted (rearward) position, such that the ridge 100 once again is proximate to (surrounds) the front half of the ball 93, 93 and thereby restricts (blocks) movement of the balls 93 radially outward. Consequently, the bit 106 is retained by the balls 93, because movement of the balls 93 is restricted owing to the engagement with (in) the engaging groove 107. Because the circumvent (wider-diameter) part 105 is formed on the rear end inner circumference of the manipulatable sleeve 99, the manipulatable sleeve 99, when being slid to the retracted position, can be slid smoothly to the retracted position without interfering with the flat spring 97.

After the bit 106 has thus been mounted in the anvil 14 by the tool holding apparatus 90, the trigger 16 may be pulled such that the switch 15 is turned ON, electric power is supplied to the motor 10, and the rotary shaft 32 rotates. That is, the microcontroller of the control circuit board 21 obtains the rotational state of the rotor 23 by acquiring the rotation detection signals, which were output from the rotation detection devices of the sensor circuit board 36 and indicate the positions of the sensor permanent magnets 35 of the rotor 23, controls the ON/OFF state of each switching device in accordance with the obtained rotational state, supplies electric current, in order, to each of the coils 27 of the stator 22, and thereby rotates the rotor 23.

Thereupon, the planetary gears 64, which mesh with the pinion 45, revolve inside the internal gear 63 and rotate the spindle 12 at a reduced speed via the carrier part 61. Thereby, the hammer 70 also rotates, the anvil 14 is rotated via the arms 79, 79, which the tabs engage, and it becomes possible to fasten a screw or bolt using the bit 106. As a fastening operation progresses and the torque of the anvil 14 increases, the hammer 70 retracts against the bias of the coil spring 71 while the balls 74 roll along the inner side cam grooves 73, 73 of the spindle 12. Then, when the tabs separate from the arms 79, 79, the hammer 70 rotates while advancing owing to the bias of the coil spring 71 and the guiding of the inner side cam grooves 73, 73, the tabs once again engage with the arms 79, 79, and a rotational impact force (an impact) is generated by the anvil 14. By repeating this process (i.e. repeatedly striking the anvil 14 in the rotational direction), further tightening is possible.

Here, because the portion of the anvil 14 that is forward of the engaging portion that includes the balls 93 is retracted by the tool holding apparatus 90 nearly as far as the ball bearing 78A, the amount of protrusion from the front tube part 48 becomes short and thereby work can be performed without hindrance even in a confined location.

In addition, because the anvil 14 is axially supported by the two (front and rear) ball bearings 78A, 78B, rattling of the anvil 14 is inhibited and vibration of the bit 106 at the tip tends not to occur.

Advantages of the Tool Holding Apparatus

Thus, in the impact driver 1 and the tool holding apparatus 90 of the above-described embodiment, the elastic body (the flat spring 97) biases the balls 93 toward the protruding position and the manipulatable sleeve 99 has a length such that the entirety of the flat spring 97 is exposed when the sleeve 99 is moved to its advanced (forward) position. Therefore, even though the manipulatable sleeve 99 is advanced forward, the balls 93 are prevented by the flat spring 97 from falling out, despite the fact that the length by which the manipulatable sleeve 99 extends rearward is relatively short. Thereby, it becomes possible to dispose the balls 93 more rearward than in the past, such that the protrusion length of the anvil 14 can be shortened even if the manipulatable sleeve 99 is used, and, in turn, the overall length of the main body part 2 can be made more compact.

In the present embodiment, because the flat spring 97 is embodied as an elastic member, which is externally mounted on (around) the anvil 14 on the radially outer side of the balls 93, the balls 93 can be easily prevented from falling out.

In addition, because the flat spring 97 has a ring shape and includes the division portion (break) 98, at which the two ends are divided in the circumferential direction, the flat spring 97 can be mounted on the anvil 14 simply.

Furthermore, because the division portion 98 is formed such that the line of the break is inclined from the axial direction, even the division portion 98 is capable of biasing the balls 93, such that it not necessary to consider phase (rotational orientation of the flat spring 97) when mounting it onto the anvil 14.

In addition, because the flat spring 97 is externally mounted on (around) the outer side of the balls 93, more particularly around the rear half side of the balls 93, the size (width) of the flat spring 97 can be minimized, which leads to a reduction in cost.

On the other hand, because the rear end (edge) of the manipulatable sleeve 99 is aligned with (surrounds) the rear end (edge) of the balls 93 in the radial direction of the anvil 14 when the manipulatable sleeve 99 is located at its retracted position, the rearward extending length of the manipulatable sleeve 99 can be maximally shortened.

In addition, because the rear end of the manipulatable sleeve 99 is not aligned with (does not surround) the balls 93, 93 in the radial direction of the anvil 14 when the manipulatable sleeve 99 is located at the advanced position, it is possible to easily replace, repair, etc. the balls 93, the flat spring 97, etc., even without demounting (removing) the manipulatable sleeve 99.

It is noted that, in the above-described embodiment, although the front-rear width of the flat spring is half the diameter of the balls, optionally the front-rear width of the flat spring 97 may be the same, or approximately the same, as the diameter of the balls 93, as shown in a tool holding apparatus 90A of FIG. 9. In addition, instead of a circumvent part (105), a tapered portion 108, which expands (radially widens) as it goes toward the rear end, may be provided on the rear side inner circumference of the ridge 100 of the manipulatable sleeve 99. If the tapered portion 108 is thus provided on the rear portion, inner circumference of the manipulatable sleeve 99, then it is possible to effectively prevent the rear end edge of the manipulatable sleeve 99 from interfering with the flat spring 97 when the sleeve 99 moves from the forward position to the rearward position.

In addition, the number, arrangement, and the like of the through holes and the balls are not limited to the above-mentioned embodiments; one of each may be provided, three of each may be provided, or the like.

Furthermore, with regard also to the shape of the flat spring, the division portion (break) can also be formed parallel to the axial direction instead of being tilted, and flat springs that are not ring-shaped and are independent for each through hole can also be used.

Furthermore, the above-described embodiment has a structure in which the balls are pressed to the protruding position at the retracted position of the manipulatable sleeve, and the pressing of the balls is released at the advanced position; however, in contrast thereto, the above-described embodiment may be modified to have a structure in which the balls are disposed on the front side of the output shaft, the balls are pressed to the protruding position at the advanced position of the manipulatable sleeve, and the pressing of the balls is released at the retracted position. In such a modified example, the flat spring is configured such that it is externally mounted on (around) the outer side of the balls on the front half side of the balls; the front end of the manipulatable sleeve at the advanced position is configured such that it is aligned with the front end of the balls in the radial direction of the output shaft; a tapered portion that expands as it goes toward the front end is formed on the front portion, inner circumference of the manipulatable sleeve; the front end of the manipulatable sleeve at the retracted position is configured such that it is not aligned with the balls in the radial direction of the output shaft; and the like.

In addition, the power tool is not limited to an impact driver; and the tool holding apparatus of the present invention can be applied also to other types of power tools, such as an angle impact driver, a screwdriver, or the like, as long as the bit is mounted on and demounted from the output shaft. In addition, the tool holding apparatus of the present teachings is not limited to electric power tools and can be utilized even with a pneumatic tool that uses an air motor, a manual tool that a driver bit can be mounted on or demounted from, or the like.

Advantages of the Axial Support Structure of the Anvil

Furthermore, in the impact driver 1 of the above-described embodiment, the anvil 14 is directly held in a rotatable manner by the two (front and rear) bearings (i.e. the first and second ball bearings 78A, 78B), and therefore the holding portion becomes longer in the front-rear direction and rattling of the anvil 14 can be effectively reduced. Thereby, vibration of the tip bit 106 can be inhibited.

In particular, because two bearings serve together as the ball bearings 78A, 78B, it is compact in the front-rear direction even though two bearings are disposed side-by-side.

In addition, because the inner diameter of the inner diameter part 48*a* of the front tube part 48 of the hammer case 8 is constant in the axial direction and is identical to the outer diameter of the ball bearings 78A, 78B, it is compact also in the radial direction.

Moreover, because the O-rings 84, 84 are disposed on the radially inner side of the ball bearings 78A, 78B, an effective seal between the anvil 14 and the ball bearings 78A, 78B is provided.

In addition, because the ball bearings 78A, 78B are inserted, from the rear, into the hammer case 8 and held thereby, the assembly of the ball bearings 78A, 78B in the hammer case 8 can be performed easily.

Furthermore, because the ball bearings 78A, 78B each comprise the inner ring 78*a*, the outer ring 78*b*, and the balls 78*c*, and because the intermediate washer 87, which makes contact with the front and rear outer rings 78*b*, is disposed between the ball bearings 78A, 78B, the ball bearings 78A, 78B can be disposed spaced apart forward and rearward, and thereby rattling of the anvil 14 can be more effectively reduced.

Furthermore, because the rear washer 81, which makes contact with the rear surface of the ball bearing 78B, is provided in the hammer case 8, the ball bearing 78B, which is inserted from the rear, can be positioned simply.

It is noted that a wider spacing may be provided between the two (front and rear) ball bearings by interposing a plurality of washers stacked in the axial direction; conversely, the ball bearings may be made to abut one another by eliminating the spacer member(s), such as the washer 87. The outer diameters of the front and rear ball bearings can also be made different from one another.

In addition, the bearings are not limited to ball bearings (single row ball bearings) in which a plurality of balls is disposed in one row between the inner ring and the outer ring as in the above-described embodiment. Instead, it is also possible to use a multi row ball bearing, in which a plurality of balls is disposed in a plurality of rows, such as two rows, between the inner ring and the outer ring, and to dispose two of the multi row ball bearings, one forward and one rearward. Furthermore, it is also possible to use needle bearings and to dispose two of them, one forward and one rearward.

Furthermore, although an impact driver was explained in the above-described embodiment in which the tool holding apparatus and the axial support structure of the anvil via two bearings are provided in combination, the impact tool may be one in which only the axial support structure of the anvil is provided, i.e. without the tool holding apparatus.

Figure 10:
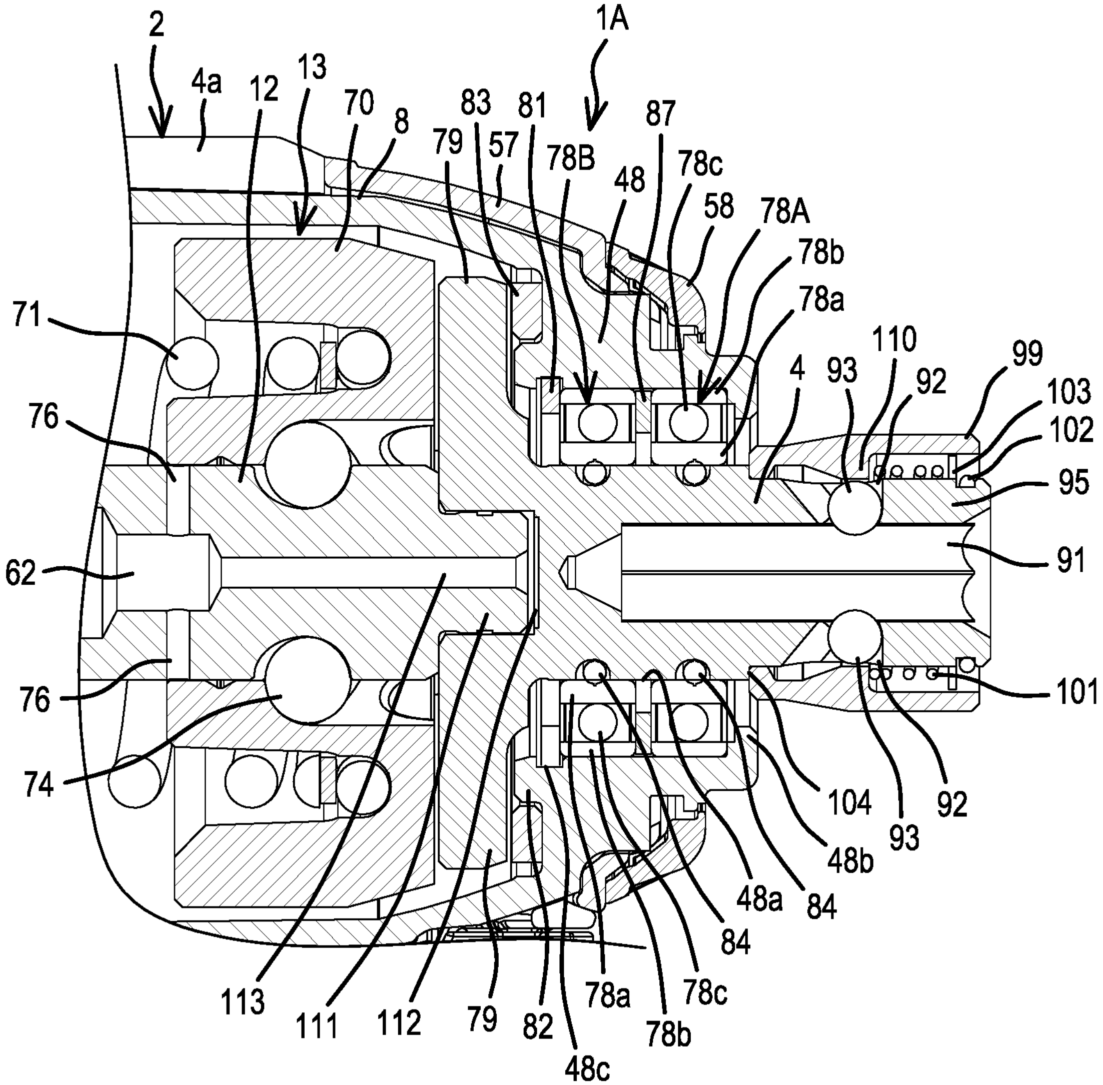
FIG. 10 is an enlarged cross sectional view of an anvil portion of another modified example of a tool holder apparatus according to the present teachings.

FIG. 10 shows one example thereof, wherein an impact driver 1A has a structure in which: a flat spring, which biases the balls 93 toward the protruding position into the insertion hole 91, is not provided on the small diameter part 95 of the anvil 14; and, at the retracted position at which the manipulatable sleeve 99 makes contact with the stopper surface 104 owing to the coil spring 101, the balls 93 are pressed to the insertion hole 91 side by a ridge 110, which encircles the inner surface of the manipulatable sleeve 99.

In addition, in the impact driver 1A, a mating projection 111 is formed at the front end of the spindle 12 at the axial center, and a mating recessed part 112, with which the mating projection 111 coaxially mates, is formed in the rear surface of the anvil 14 at the axial center. At the axial center of the spindle 12, an axial center hole 113 is formed that passes from the bottomed hole 62 through to the mating projection 111, and provides (permits) fluid communication between the bottomed hole 62 and the mating recessed part 112, such that lubrication between the spindle 12 and the anvil 14 is achieved by supplying grease inside the bottomed hole 62 to the mating recessed part 112.

It is noted that, in the impact driver 1A, too, because the ball bearings 78A, 78B and the intermediate washer 87 are disposed on the radially outer side of the insertion hole 91, the length in the front-rear direction is shorter than when the ball bearings 78A, 78B and the intermediate washer 87 are disposed rearward of the insertion hole 91.

Verification of Vibration Inhibiting Effect

The impact driver 1A shown in FIG. 10 was compared with product families sold prior to the application filing date, and the advantage of a vibration inhibiting effect was confirmed.

Figures 11A, 11B:
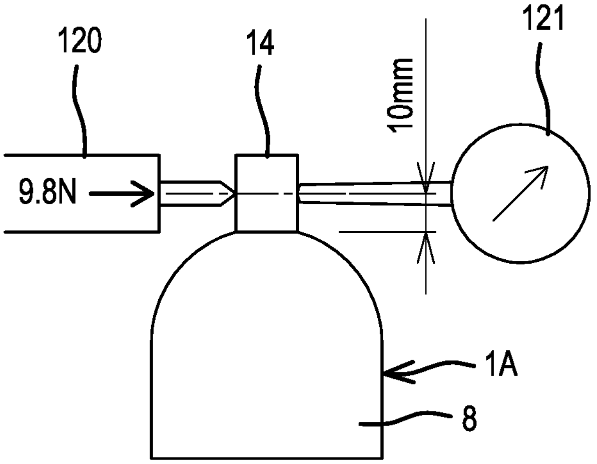
FIG. 11A is an explanatory diagram of a method of verifying a vibration inhibiting effect of the impact driver according to the modified example.
FIG. 11B is a verification results table that includes other product families.

The verification method (setup) is shown in FIG. 11A. Here, to measure the above-mentioned product families under the same conditions, a load of 1 kgf (9.8 N) was applied to the anvil 14 from the left and right (laterally) by a force gauge 120 at a location that is 10 mm from a front end surface of the hammer case 8, a dial gauge 121 was disposed at a location on the opposite side thereof, and the degree of left-right (lateral) displacement of the anvil 14 was measured by the dial gauge 121. Here, 1 kgf (9.8 N) is the assumed load when the anvil 14 is twisted (a force that is applied in a direction deviating from the axis) during screw fastening.

The verification results are shown in the table of FIG. 11B. The bearing types are shown in the table, but two ball bearings were used only in the working example of the present disclosure. In the two ball bearing embodiment of the present teachings, as shown in the table, the (lateral) displacement when a load of 1 kgf (9.8 N) was applied was an average of 0.02 mm, and it can be seen that, compared with other product families, the vibration of the anvil 14 was extremely small.

It is noted that, in the present embodiment, up to 0.04 mm is allowed, including some deviation in precision. In this case, too, the advantage over other product families is maintained. In addition, it may also be 0.02 mm or less. For example, if it is 0.01 mm or less, then the vibration of the anvil 14 becomes even smaller, and the impact driver becomes easier to use.

It is noted that the above-mentioned product families used various bearings, but there are also situations in which it can be made 0.04 mm, the same as in the present embodiment, by increasing the precision of the bearing, hammer case, and anvil.

EXPLANATION OF THE REFERENCE NUMBERS

1, 1A Impact driver
2 Main body part
3 Grip part
4 Main body housing
8 Hammer case
10 Motor
11 Planetary gear, speed-reducing mechanism
12 Spindle
13 Impact mechanism
14 Anvil
22 Stator
23 Rotor
32 Rotary shaft
48 Front tube part
48*a* Inner diameter part
70 Hammer
78A, 78B Ball bearing
78*a* Inner ring
78*b* Outer ring
78*c* Ball
81 Rear washer
84 O ring
87 Intermediate washer
90, 90A Tool holding apparatus
91 Insertion hole
92 Through hole
93 Ball
94 Opening
95 Small diameter part
96 Retaining groove
97 Flat spring
98 Division portion
99 Manipulatable sleeve
100 Ridge
101 Coil spring
106 Bit
107 Engaging groove
108 Tapered portion

The invention claimed is:

1. An impact tool comprising:
a motor;
a spindle configured to be rotated by the motor;
a hammer case;
a hammer disposed in the hammer case and configured to be rotated by the spindle;
an anvil configured to be impacted by the hammer;
a bearing disposed between the hammer case and the anvil; and
an O-ring is disposed between the anvil and the bearing.

2. The impact tool according to claim 1, wherein:
the hammer case includes a front tube part, and
the O-ring is disposed radially inward of the front tube part.

3. The impact tool according to claim 1, further comprising:

a bumper fixedly mounted on an outer circumference of a front tube part of the hammer case.

4. The impact tool according to claim 1, further comprising:

an LED disposed on a radially outer side of a front tube part of the hammer case.

5. The impact tool according to claim 1, wherein a front tube part of the hammer case includes a projection that extends radially inward from an inner diameter surface of the front tube part.

6. The impact tool according to claim 1, further comprising:

a washer disposed between the anvil and a front tube part of the hammer case.

7. The impact tool according to claim 6, wherein:

the front tube part includes a ring-shaped projection that extends radially inward from an inner diameter surface of the front tube part, a first radially extending surface of the washer contacts the ring-shaped projection, and a second radially-extending surface of the washer contacts the bearing.

8. The impact tool according to claim 1, wherein the bearing axially and rotatably supports the anvil relative to the hammer case.

9. The impact tool according to claim 8, wherein the bearing is a ball bearing.

10. The impact tool according to claim 8, wherein:

the hammer case includes a front tube part, and the O-ring is disposed radially inward of the front tube part.

11. The impact tool according to claim 10, wherein the front tube part includes a projection that extends radially inward from an inner diameter surface of the front tube part.

12. The impact tool according to claim 11, further comprising:

a washer disposed between the front tube part and the anvil.

13. The impact tool according to claim 12, wherein:

the projection is a ring-shaped projection, a first radially extending surface of the washer contacts the ring-shaped projection, and a second radially-extending surface of the washer contacts the bearing.

14. The impact tool according to claim 13, further comprising:

a bumper fixedly mounted on an outer circumference of the front tube part.

15. The impact tool according to claim 14, further comprising:

an LED disposed on a radially outer side of the front tube part.

16. The impact tool according to claim 15, wherein the bearing is a ball bearing.

17. The impact tool according to claim 1, wherein the O-ring is disposed between the anvil and the bearing in a radial direction of the anvil.

18. The impact tool according to claim 1, wherein the O-ring provides a seal between the anvil and the bearing.

19. The impact tool according to claim 1, wherein:

the bearing has an inner ring and an outer ring, the inner ring contacts and rotates together with the anvil, the outer ring is fixed to the hammer case such that the inner ring is rotatable relative to the outer ring, and the O-ring directly contacts the anvil and the inner ring.

20. The impact tool according to claim 1, wherein:

the anvil has a circumferentially-extending groove, and the O-ring is disposed in the circumferentially-extending groove.

21. The impact tool according to claim 20, wherein:

the O-ring is disposed between the anvil and the bearing in a radial direction of the anvil, and the O-ring provides a seal between the anvil and the bearing, the hammer case includes a front tube part, and the O-ring is disposed radially inward of the front tube part.

22. The impact tool according to claim 21, wherein:

the bearing has an inner ring and an outer ring, the inner ring contacts and rotates together with the anvil, the outer ring is fixed to the hammer case such that the inner ring is rotatable relative to the outer ring, and the O-ring directly contacts the anvil and the inner ring.

23. The impact tool according to claim 22, wherein the bearing is a ball bearing or needle bearing.

24. The impact tool according to claim 1, wherein the bearing is a ball bearing or needle bearing.

25. An impact tool comprising:

a motor;

a spindle configured to be rotated by the motor;

a hammer case;

a hammer disposed in the hammer case and configured to be rotated by the spindle;

an anvil having arms configured to be impacted by the hammer and an anvil shaft extending forward from the arms, an O-ring circumferentially surrounding the anvil shaft, the O-ring being a separate member from the anvil, and a bearing disposed radially inward of the hammer case, the bearing circumferentially surrounding the O-ring and rotatably supporting the anvil shaft.

26. The impact tool according to claim 25, wherein:

the anvil shaft has a circumferentially-extending groove, and the O-ring is disposed in the circumferentially-extending groove.

* * * * *